Patented Mar. 23, 1943

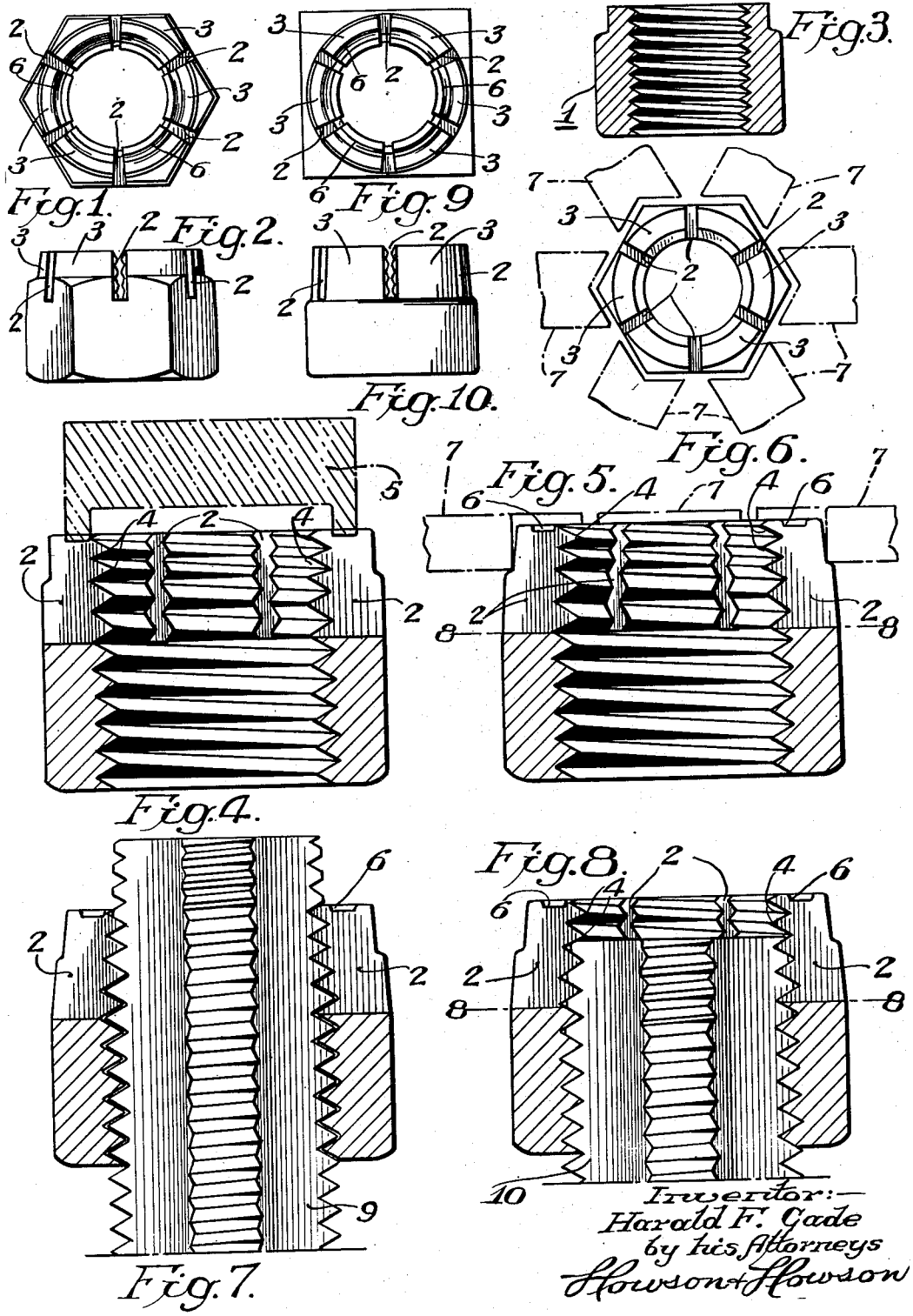

2,314,780

UNITED STATES PATENT OFFICE 2,314,780

LOCK NUT AND METHOD OF MANUFACTURE

Harald F. Gade, Philadelphia, Pa., assignor to Pennsylvania Manufacturing Company, Jenkintown, Pa., a corporation of Delaware Application August 21, 1942, Serial No. 455,640

10 Claims. (Cl. 10—86)

This invention relates to lock nuts, and a principal object of the invention is to provide an all-metal nut of the self-locking type having generally improved characteristics, as hereinafter set forth.

It has been proposed to provide self-locking nuts wherein the locking action is effected through the medium of one or more segmental portions at the trailing end of the nut formed so as to bear forcibly and resiliently against the companion bolt or stud upon which the nut is threaded to thereby frictionally bind the nut in place. It has been proposed also to provide self-locking nuts wherein the pitch of the threads at the outer end of the nut is slightly reduced by a so-called "staking" operation so as to create a binding between the abnormal threads of the nut and the normal threads of the companion bolt or stud. Each of these procedures has its peculiar advantages and also its limitations. In the use of the resilient segmental portions, for example, there is some tendency for the segments to gradually lose resiliency and, particularly if the nut is used upon a slightly oversized bolt, to take a permanent set in the retracted or partially retracted position whereby the frictional resistance to the turning of the nut on the bolt is substantially reduced; and difficulty is also experienced by reason of an unavoidable deformation of the threads at the points where the segments have been bent inwardly toward the axis of the nut bore, this deformation being uncontrolled and frequently resulting in an undue binding of the nut on the bolt. The aforesaid staking operation, on the other hand, is lacking in flexibility to such an extent that it is difficult to bring it into conformity with the normal range of variation in bolt diameters, and while this method of locking is highly effective in some instances, it is in others apt to afford either a too great or insufficient locking action.

A principal object of the invention is to provide a self-locking nut wherein these two methods are combined in a manner to produce a nut of superior characteristics.

Another object of the invention is to provide a nut wherein the locking function resides entirely in one or more convolutions of the thread at the trailing end of the nut, any distortions of the thread other than in the locking area and occurring as a result of the manufacturing process being corrected as hereinafter described.

More particularly, an object of the invention is to provide a nut of the all-metal type wherein the self-locking action is sufficiently flexible and at the same time sufficiently precise to permit the nut to lock effectively on bolts differing in pitch diameter over a considerable range.

The invention will be more readily understood by reference to the attached drawing, wherein:

Figures 1 and 2 are, respectively, top plan and elevational views of a nut made in accordance with my invention;

Fig. 3 is a vertical sectional view of a blank from which the nut shown in Figs. 1 and 2 may be produced;

Figs. 4 and 5 are sectional views illustrating different operations in the process of manufacture;

Fig. 6 is a plan view still further illustrating the step of manufacture illustrated in Fig. 5;

Figs. 7 and 8 are sectional views illustrating further steps in the process of manufacture, and Figs. 9 and 10 are top plan and elevational views illustrating a modification within the scope of the invention.

In producing a nut in accordance with the invention, I may employ a threaded blank 1 of the form, for example, illustrated in Fig. 3, or of any conventional form. As an initial step, this blank may be sawed or otherwise slotted at its outer end, as indicated at 2, to provide segmental portions 3 which form in effect axial extensions of the solid body of the nut. A subsequent step in the process of manufacture consists in axially contracting the thread at the upper end of the nut, as indicated at 4 in Fig. 4. This may be accomplished by means, for example, of a staking die 5, which when forcibly driven into the top of the nut around the bore causes a reduction in pitch in the adjoining convolutions of the thread. As a further result of this staking operation, the end surfaces of the segments 3 exhibit arcuate recesses 6.

The segmental portions 3 are now forced inwardly, by means, for example, of a suitable closing die shown in broken lines in Figs. 5 and 6 and indicated by the reference numeral 7. The inward displacement of the segments is sufficient to give them a permanent set in a position inclined towards the axis of the nut bore. The major portion of this bending occurs at the bases of the segments which are defined by the inner ends of the slots or kerfs 2, and as a result the thread in the plane 8—8 of this bending exhibits a contraction or distortion which, if uncorrected, would interfere materially with the normal threading of the nut on a bolt.

Preferably, the aforedescribed displacement of the segments 2 will be in excess of that required for the desired locking action; and the staking operation also will have been of a character to contract the thread at the outer end of the nut to an extent greater than that required. For the purpose of correction in these respects, the nut is now subjected to a retapping operation employing a tap of somewhat smaller pitch diameter than the tap originally used in threading the blank 1. This operation is illustrated in Fig. 7, the sizing tap being indicated by the reference numeral 9. This tapping operation has the effect of partially correcting both the contration of the thread resulting from the staking operation and the inward displacement of the segmental portions 2 by the closing-in die so that the threads in the segments are limited to certain predetermined minimums of pitch and pitch diameter conforming to the pitch and pitch diameter of the sizing tap.

As previously set forth, the operation of displacing the segmental portions 3 of the nut results in a distortion of the thread in a transverse plane 8—8 through the bottoms of the slots 2, and this distortion, if uncorrected, would tend to bind the nut on the companion bolt irrespective of the locking action of the prepared and accurately sized threads at the outer ends of the segments.

A further step in the process of manufacture consists in subjecting the nut to an additional tapping operation with a tap of the pitch and pitch diameter employed originally in forming the threads in the blank 1. This operation is illustrated in Fig. 8 wherein the tap is indicated by the reference numeral 10. This tap 10 is not passed completely through the nut, but only to an extent beyond the plane 8—8, which in this instance corresponds to the lower ends of the slots 2, and to within say one and one-half or two convolutions of the thread from the upper end of the nut. As a result of this tapping operation, the nut thread is returned to the normal state from the bottom to a point adjacent the top of the nut, so that the locking function is vested solely in the remaining portion of the thread at the top of the nut which has been carefully prepared and sized, as previously described, to perform that function. In this manner, extremely high degrees of accuracy and uniformity in the locking action are obtainable, and the locking strength may be accurately varied by selection of the sizing tap.

The locking action results in part from the resilient pressure of the segments 3 against the side of the bolt, and in part by the somewhat reduced pitch of the locking portion of the thread effected by the staking operation. Thus, the stability of the latter locking factor is supplemented by the flexibility of the former with the result that the range of the locking action is materially increased and will remain effective over relatively extended periods of use and in spite of material variations in size of the bolts or studs to which the nuts may be applied.

There may be some modification without departure from the invention. The form of the original blank nut may vary considerably, as illustrated in Figs. 9 and 10, wherein I have shown a nut having a square body provided with a cylindrical extension in which the resilient locking segments are formed by means of the typical axially extending slots. Although I have found it preferable to perform the staking operation after the slotting and before the closing-in operations, it will be apparent that the staking operation may take place before slotting or after the closing-in operation. I have found, however, as stated, that the most satisfactory results are obtainable by the succession of steps herein specifically described.

I claim:

1. A nut having at one end a segmental portion resiliently displaceable in radial direction and extending toward the axis of the nut so as to obstruct the normal bore and the free passage of the nut onto a companion bolt and to bear resiliently against the latter, the thread of the nut being substantially normal from the other end of the nut to a point beyond the juncture of the segmental portion with the body of the nut and adjacent to the outer end of the segment, a part at least of the remaining portion of the thread being of lesser pitch and pitch diameter.

2. A nut having a segmental portion at one end thereof forming a continuation of the wall of said nut, said segment converging toward the axis of the nut so as to obstruct the normal bore of the latter and being resiliently displaceable in radial direction, the thread of the nut being substantially uniform from the other end of the nut to a point adjoining the first-named end and beyond the juncture of the said segmental portion with the solid wall of the nut, and a part at least of the remaining portion of the thread being of reduced pitch and pitch diameter.

3. A nut having a segmental portion at one end thereof forming a continuation of the wall of said nut, said segment converging toward the axis of the nut so as to obstruct the normal bore of the latter and being resiliently displaceable in radial direction, the thread of the nut being substantially uniform from the other end of the nut to a point adjoining the first-named end and beyond the juncture of the said segmental portion with the solid wall of the nut, and a part at least of the remaining portion of the thread being also substantially uniform but of reduced pitch and pitch diameter.

4. A nut having a segmental portion at one end thereof forming a continuation of the wall of said nut, said segment converging toward the axis of the nut so as to obstruct the normal bore of the latter and being resiliently displaceable in radial direction, the thread of the nut being uniform as to pitch and pitch diameter from the other end to a point adjoining the first-named end and beyond the line where the said segmental portion begins to converge toward the nut axis.

5. A nut having a segmental portion at one end thereof forming a continuation of the wall of said nut, said segment converging toward the axis of the nut so as to obstruct the normal bore of the latter and being resiliently displaceable in radial direction, the thread of the nut being substantially uniform from the other end of the nut to a point adjoining the first-named end and beyond the juncture of the said segmental portion with the solid wall of the nut, and a part at least of the remaining portion of the thread being also substantially uniform but of somewhat reduced pitch.

6. A self-locking nut having a segmental portion at one end thereof forming a continuation of the solid wall of the nut, said segment converging toward the axis of the nut so as to obstruct the normal bore of the latter and being resiliently displaceable in radial direction, the thread of the nut being normal to a point adjacent the outer end of said segment and beyond the line where said convergence starts, and the remaining portion of the thread being formed to frictionally interlock with the thread of the companion bolt.

7. In the manufacture of self-locking nuts, the method which consists in slotting a threaded nut blank from one end to form a plurality of segmental portions, performing work on said segmental portions to slightly reduce the pitch of the thread adjoining the outer ends of the segments and to displace the segments toward the axis of the nut so as to cause them to obstruct the normal bore of the latter and to resiliently resist the threading of the nut on a companion bolt, subjecting the nut to a retapping operation with a tap of lesser pitch diameter than the tap used in producing the original threads in the blank, and subjecting the nut to a further retapping operation with a tap corresponding in pitch diameter to the said original tap, the last-named tapping operation embracing only that portion of the thread extending from the unslotted end of the nut to a point beyond the base of said slots and adjacent to the outer ends of said segments.

8. In the manufacture of self-locking nuts, the method which consists in slotting a threaded blank from one end so as to form a plurality of segmental portions, displacing said segments inwardly toward the axis of the nut so as to obstruct the normal bore of the latter and to resiliently resist the threading of the nut on a companion bolt, subjecting the nut to a retapping operation with a tap of lesser pitch diameter than the tap used originally in forming the threads in the blank, and again retapping the nut from the unslotted end to a point adjacent the outer ends of the segments with a tap corresponding to the said original tap.

9. In the manufacture of self-locking nuts, the method which consists in forming a nut having at one end a plurality of segmental portions forming continuations of the solid wall of the nut and converging toward the axis of the nut so as to obstruct the normal bore of the latter and being resiliently displaceable in radial direction and with the portion of the thread adjoining the outer ends of the segments of somewhat lesser pitch than the remaining portion of the thread, subjecting the nut to successive retapping operations, one with a tap of lesser pitch diameter than the tap originally used in threading the blank, and the other with a tap corresponding to the said original tap, said last-named retapping operation excluding the aforesaid portion of the thread adjoining the outer ends of said segments.

10. In the manufacture of self-locking nuts, the method which comprises forming a nut with a plurality of segmental portions at one end thereof constituting continuations of the wall of said nut and converging toward the axis of the nut so as to obstruct the normal bore of the latter and being resiliently displaceable in radial direction, retapping the nut throughout with a tap of lesser pitch diameter than the tap originally used in forming the threads in the nut, and again retapping the nut with a tap corresponding to the said original tap from the opposite end of the nut to a point adjacent the outer ends of said segments.

HARALD F. GADE.